United States Patent
Yeager et al.

(10) Patent No.: US 10,401,232 B2
(45) Date of Patent: Sep. 3, 2019

(54) VISUAL AND ELECTRONICALLY READABLE TEMPERATURE INDICATOR

(71) Applicants: Steve Yeager, Miami Township, OH (US); Justine Gaston, Riverside, OH (US); Carl M. Lentz, Waynesville, OH (US); Randall Lane, Lebanon, OH (US)

(72) Inventors: Steve Yeager, Miami Township, OH (US); Justine Gaston, Riverside, OH (US); Carl M. Lentz, Waynesville, OH (US); Randall Lane, Lebanon, OH (US)

(73) Assignee: KLT Technology, Inc., Dayton, OH (US)

( * ) Notice: Subject to any disclaimer, the term of this patent is extended or adjusted under 35 U.S.C. 154(b) by 187 days.

(21) Appl. No.: 15/415,301

(22) Filed: Jan. 25, 2017

(65) Prior Publication Data

US 2017/0211992 A1 Jul. 27, 2017

Related U.S. Application Data

(60) Provisional application No. 62/286,698, filed on Jan. 25, 2016.

(51) Int. Cl.
*G01K 7/20* (2006.01)
*G01K 7/24* (2006.01)
(Continued)

(52) U.S. Cl.
CPC .............. *G01K 7/20* (2013.01); *G01K 1/024* (2013.01); *G01K 7/24* (2013.01); *G01K 11/06* (2013.01); *G01K 11/12* (2013.01)

(58) Field of Classification Search
CPC ............ G01K 7/20; G01K 1/024; G01K 7/24; G01K 11/12; G01K 11/06

(Continued)

(56) References Cited

U.S. PATENT DOCUMENTS 4,280,441 A 7/1981 McNeeley
7,209,042 B2 4/2007 Martin et al.
(Continued)

FOREIGN PATENT DOCUMENTS

JP 2003-065862 3/2003
JP 2011-216221 10/2011
JP 2014-169918 9/2014

OTHER PUBLICATIONS

PCT, International Search Report and Written Opinion, International Application No. PCT/US2017/014872 (dated Apr. 20, 2017).

*Primary Examiner* — Natalie Huls
*Assistant Examiner* — Janice M Soto
(74) *Attorney, Agent, or Firm* — FisherBroyles, LLP; Susan M. Oiler

(57) ABSTRACT

Visual and electronically readable temperature indicators and methods of making the same have an electric circuit with a microchip and a bridge within the circuit, and a facing material over the electric circuit. The bridge includes either a single layer or multiple layers that include a conductive material, a phase change material having a pre-selected melt temperature, a binder, a first colorant that is soluble in the phase change material and/or a second colorant that is a special effect pigment. In operation, at temperatures below the pre-selected melt temperature, the bridge is electrically conductive, and at a temperature at or above the pre-selected melt temperature, the phase change material melts and dilutes the conductive material, so that the bridge is electrically non-conductive, and a color change occurs that is visible to the user through the facing material such as through a transparent window or in an absorbent material.

13 Claims, 3 Drawing Sheets

(51) Int. Cl.
*G01K 11/06* (2006.01)
*G01K 11/12* (2006.01)
*G01K 1/02* (2006.01)

(58) Field of Classification Search
USPC .................................. 374/160, 102, 100, 114
See application file for complete search history.

(56) References Cited

U.S. PATENT DOCUMENTS

| | | |
|---|---|---|
| 7,306,489 B2 | 12/2007 | Werthman et al. |
| 7,380,982 B2 | 6/2008 | Lohokare |
| 7,795,605 B2 | 9/2010 | Habib et al. |
| 8,066,432 B2 | 11/2011 | Yang et al. |
| 8,267,576 B2 | 9/2012 | Haarer et al. |
| 8,395,521 B2 | 3/2013 | Kauffman et al. |
| 8,968,662 B2 | 3/2015 | Haarer et al. |
| 2013/0038454 A1* | 2/2013 | Cooperman ........... G01K 11/06 340/584 |
| 2013/0224875 A1 | 8/2013 | Haarer et al. |
| 2014/0104668 A1* | 4/2014 | Feng .................... G02F 1/0147 359/288 |
| 2016/0290871 A1* | 10/2016 | Kozono .................... B32B 7/12 |
| 2017/0074850 A1* | 3/2017 | Kiryukhin .............. G01N 33/12 |

* cited by examiner

To Antenna

VISUAL AND ELECTRONICALLY READABLE TEMPERATURE INDICATOR

RELATED APPLICATIONS

This application claims the benefit of U.S. Provisional Application 62/286,698, filed Jan. 25, 2016, the entirety of which is incorporated herein by reference.

TECHNICAL FIELD

The present invention relates generally to a visual and electronically readable temperature indicator and, more particularly, to a temperature indicator having a bridge in a portion of the circuitry that changes from conductive to nonconductive upon occurrence of a temperature event.

BACKGROUND

It is imperative for certain products to be kept below a specific temperature, for example perishable foods and pharmaceuticals. It has long been a problem to track the temperatures of such products and many methods and devices have been tried, but there is still room for improvement.

Currently, there are irreversible indicators available that undergo a permanent color change when exposed to a temperature excursion. Also, there are electronic temperature monitors that can record the temperature to which a product has been exposed over a specified time interval, i.e., time-temperature indicators. These electronic temperature monitors are battery powered, which is a limitation because the battery could die or fail and data may not be collected or may be lost.

There is a need for indicators that do not use a battery, provide self-verification, and have more than one mode of indicating a temperature event.

SUMMARY

In one aspect, reversible temperature indicators for products that require an accurate indication of when they have exceeded a specific temperature are disclosed. The reversible temperature indicators include an electric circuit having a microchip and a bridge within the circuit, which may be a bypass circuit around the microchip or a connection to code circuit contacts, and a facing material over the electric circuit. The facing material includes a transparent window or an absorbent material over at least a portion of the bridge.

In one aspect, the bridge has a single layer construction made of a conductive material, a phase change material having a pre-selected melt temperature, a binder, and a first colorant soluble in the phase change material. At temperatures below the pre-selected melt temperature, the bridge is electrically conductive, and at a temperature at or above the pre-selected melt temperature, the phase change material melts and dilutes the conductive material, so that the bridge is electrically non-conductive, and the single layer experiences a color change at a temperature at or above the pre-selected melt temperature that is visible to a user through the transparent window or in the absorbent material. If the bridge is in a bypass around the microchip, the microchip is non-readable at temperatures below the pre-selected melt temperature and is readable at a temperature at or below the pre-selected melt temperature. If the bridge is over code circuit contacts, the microchip reads a first code at a temperature below the pre-selected melt temperature (when the bridge is electrically conductive) and reads a second, different code after exposure to a temperature at or above the pre-selected melt temperature (when the bridge is non-electrically conductive or has reduced conductivity relative to the conductivity experienced at temperatures below the pre-selected melt temperature).

In another aspect, the bridge has two layers: a base layer having a conductive material and a first binder, and a top layer, applied over the base layer, having a phase change material having a pre-selected melt temperature, a colorant, and a second binder. The colorant is soluble in the phase change material and/or is a special effect pigment. At temperatures below the pre-selected melt temperature, the bridge has an original electrically conductive state. At a temperature at or above the pre-selected melt temperature, the phase change material melts and dilutes the conductive material, thereby rendering the bridge non-conductive or less conductive than the original electrically conductive state and a color change occurs that is visible to a user through the transparent window or in the absorbent material. If the bridge is in a bypass around the microchip, the microchip is non-readable at temperatures below the pre-selected melt temperature and is readable at a temperature at or below the pre-selected melt temperature. If the bridge is over code circuit contacts, the microchip reads a first code at a temperature below the pre-selected melt temperature (when the bridge is electrically conductive) and reads a second, different code after exposure to a temperature at or above the pre-selected melt temperature (when the bridge is non-electrically conductive or has reduced conductivity relative to the conductivity experienced at temperatures below the pre-selected melt temperature).

In one embodiment, the colorant is a special effect pigment that has a first orientation in the top layer that is transparent to the user. Then, at a temperature at or above the pre-selected melt temperature, the special effect pigment remains as a top layer over the base layer after the phase change material melts and dilutes into the base layer; thus, both making the top layer transparent (i.e., the PCM changes from a white color to clear) and changing the special effect pigment to a second orientation that has a reflectance of color. The color change visible to the user is typically from white to a color other than black.

In one embodiment, the colorant is soluble in the phase change material, thereby, as applied, imparting a color to the top layer. At a temperature at or above the pre-selected melt temperature, the colorant dilutes the conductive material collectively with the phase change material and the color of the base layer dominates the color of the colorant and the color of the base layer is visible to the user as a color change. The color change visible to the user is typically from a color other than black or white to black. Here, the transparent window is preferred over the absorbent material for the facing material.

In another embodiment, the colorant comprises a special effect pigment that has a first orientation in the top layer that is transparent to the user and a dye that is soluble in the phase change material and imparts a color to the top layer. The color of the dye is visible to the user through a transparent window in the facing material. At a temperature at or above the pre-selected melt temperature, the special effect pigment remains as a top layer over the base layer and the dye and phase change material collectively dilute the base layer leaving the special effect pigment in a second orientation that has a reflectance of color visible to the user through the transparent window. As such, the reflectance of color from the special effect pigment is different than the color of the dye.

In any aspect of the two layer construction of the bridge, the first and second binders can be the same or are different. The binder in the base layer includes a water soluble polymer, a solvent soluble polymer, or a combination thereof. The water soluble polymer is selected from the group consisting of polyvinylpyrrolidone, polyvinyl alcohol, hydroxy ethylcellulose, and combinations thereof, and the solvent soluble polymer is selected from the group of acrylics, styrene block copolymers, ethylcellulose, and combinations thereof.

In all embodiments, the electronic circuit may be a radio frequency identification (RFID) tag, the phase change material has a pre-selected melt temperature within a range of 20° C. to 80° C., and the conductive material comprises metal in powder form, such as nickel, copper, zinc, tin, aluminum, silver, carbon, graphene, or combinations thereof.

In another aspect, methods for making visual and electronically readable temperature indicators are disclosed that include providing an electronic circuit having a microchip and having an antennae forming part of an open bypass circuit around the microchip, applying a composition to the open bypass circuit at a position forming a bridge that closes the bypass circuit, the coating comprising a conductive material, a phase change material having a pre-selected melt temperature, a colorant, and a binder and/or emulsifier, and covering the coating with a facing material. At temperatures below the pre-selected melt temperature, the bridge is electrically conductive and the microchip is non-readable, and at a temperature at or above the pre-selected melt temperature, the phase change material melts and dilutes the conductive material, so that the bridge is electrically non-conductive and the microchip is readable, and the colorant is visible at the facing material. More detailed aspects of the visual and electronically readable temperature indicators are set forth above and herein.

In one embodiment, applying the composition includes applying a base layer comprising the conductive material and the binder and, subsequently, applying to the base layer a top layer comprising the phase change material, the colorant, and the binder and/or emulsifier.

In all aspects, applying the composition(s) includes applying the composition as a wet composition and, subsequently, drying the wet composition.

DETAILED DESCRIPTION

Figure 1:
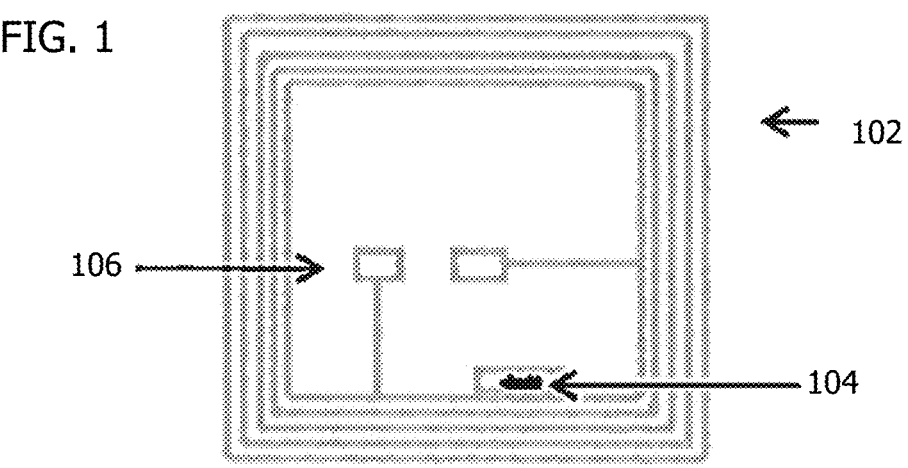
FIG. 1 is a top plan view of an RFID tag.

The following detailed description will illustrate the general principles of the invention, examples of which are additionally illustrated in the accompanying drawings. In the drawings, like reference numbers indicate identical or functionally similar elements.

Hybrid indicators, as used herein, means a temperature indication that uses electronics as well as a visual color or a color change to signal when a predetermined temperature limit has been reached. This mechanism creates a system that verifies itself. The color or color change allows for visual identification of which tag, and ergo which product, has reached a predetermined temperature, typically an undesired temperature. An electronic signal is also sent out, which can be read by an electronic reader. Thus, warning and documenting that the product has reached the predetermined temperature, which if it is an undesired temperature, documents that the product has been compromised.

Referring now to FIG. 1, in one aspect of a hybrid indicator, the electronics are present as an RFID circuit 102, but is not limited thereto, and may be any other electronic circuit having no battery and being electronically readable, such as a printed circuit board. A basic RFID system is comprised of an RFID tag and an RFID reader. The RFID circuit 102 has two basic components: a microchip 104 and an antenna 106. The microchip 104 contains information about the product, for example, but not limited to, the product name, lot code or unique serial number, interne links to the manufacturer for instructions and data upload to the cloud, etc., and may include a serial number unique to the RFID circuit 102. Herein, the RFID circuit may be referred to as an RFID tag or RFID label when it is affixed to a product or its packaging. Typically, the antenna 106 collects energy from the reader and turns on the microchip. The RFID reader receives data from the microchip through the tag's antenna. The tag can be made to transmit the data by any number of RFID systems: low frequency, high frequency, UHF, NFC, or microwave.

Figure 2:
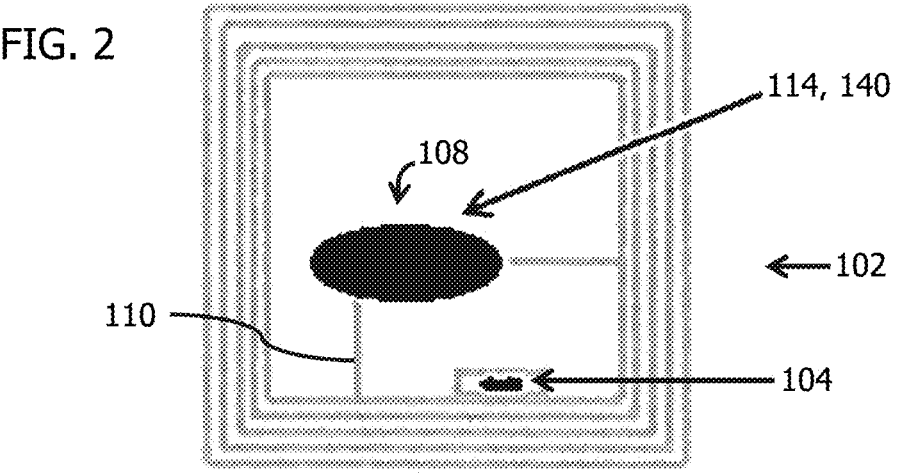
FIG. 2 is a top plan view of the RFID tag of FIG. 1 with a base layer of conductive material as a bridge to form a bypass circuit around the microchip.

The electronic circuit 102 of FIG. 1 is then modified as shown in FIG. 2 to include a bridge 108 connecting the antenna 106 to an electrical lead to form a bypass circuit 110 around the microchip 104. The bridge 108 includes a conductive material, such that the bypass circuit 110 is initially conductive, meaning that current is diverted around the microchip 104 so that the microchip cannot be read. The bridge 108 also includes a phase change material and a colorant. Once a facing material 112 is placed over the electronic circuit having a bridge as disclosed herein, the structure is referred to herein as a hybrid indicator 100 as labeled in FIG. 3.

The bridge 108 with its conductive material, phase change material, and colorant may be present as a single layer composition or as a multi-layer composition. The single layer composition is designated by reference number 140 in FIG. 2 and is shown in more detail in FIG. 6. The multi-layer composition is designated by a first layer 114 in FIG. 2 and a second layer 116 shown in FIG. 3 as applied onto the first layer 114. Each of these embodiments will be discussed in detail below, beginning with the multi-layer composition for the bridge 108.

Figure 3:
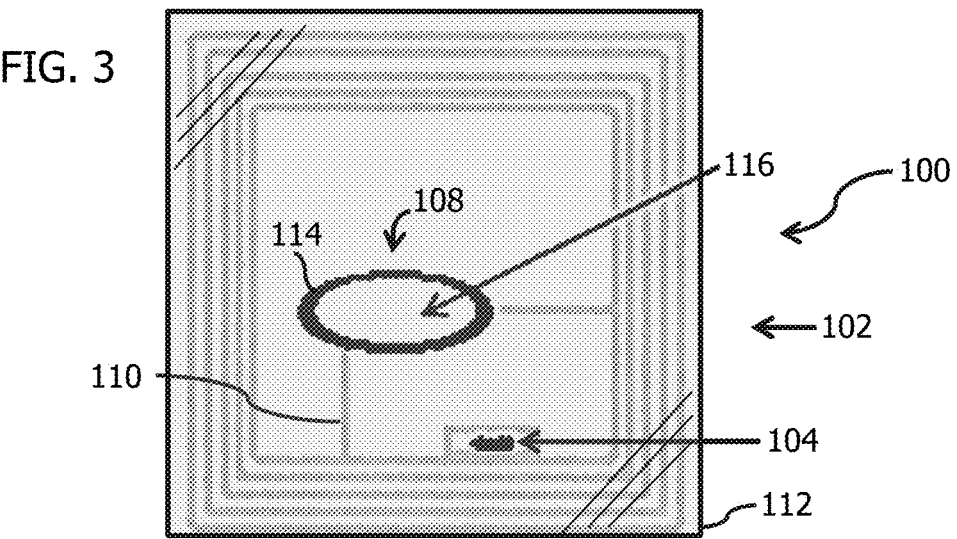
FIG. 3 is a top plan view of the RFID tag of FIG. 2 with a top layer of phase change material and a colorant over the base layer of the bridge, and a facing material over the RFID tag.
Figure 4:
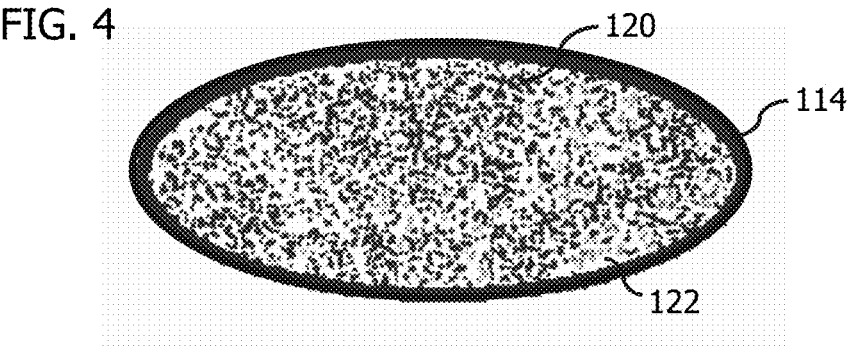
FIG. 4 is an enlarged, top plan view of the base layer of conductive material.

Referring now to FIGS. 2-4, the first layer 114 is applied to the antenna 106 and/or an electrical lead to render the bypass 110 electrically conductive. The application of the first layer 114 may be any known method, such as, printing, daubing, coating, or any other method of applying a wet composition that subsequently dries. Printing methods include, but are not limited to, flexography, screen printing, gravure, and stenciling. The composition of the first layer 114, with reference to FIG. 4, is comprised of a binder 122, a solvent (evaporated), and a conductive powder 120. This composition typically comprises about 20 to about 55 percent by weight of the conductive powder, about 2 to about 20 percent by weight of binder, and about 25 to about 78 percent by weight of solvent.

The binder 122 can be comprised of either water soluble polymers and/or solvent soluble polymers. Solvent soluble polymers include, but are not limited to, acrylics, block copolymers, such as styrene isoprene styrene, ethylcellulose, and combinations thereof. Water soluble polymers include, but are not limited to, polyvinylpyrrolidone, polyvinyl alcohol, hydroxy ethylcellulose, and combinations thereof. The binder is selected to provide adhesion of the composition to the surface of the electronic circuit, to be flexible while maintaining conductivity, and to be semi-soluble in a component of a temperature sensitive composition (second layer 116) when it melts.

The solvent is one that is effective at dissolving the binder and at evaporating at a reasonable rate. Examples of suitable solvents include water, isopropyl alcohol, ethyl alcohol, mineral spirits, toluene, xylene, esters, and glycol ethers, and combinations thereof.

The conductive powder is one that is dispersed in the binder and solvent solution, and when the coating is applied and dried, the conductive powder is held by the binder onto the electronic circuit, thereby forming a conductive pathway. Example conductive powders include copper, tin, zinc, aluminum, silver, nickel, and carbon, such as graphene. In one embodiment, the composition that results in the first layer 114 is comprised of nickel powder, isopropyl alcohol, and ethylcellulose. The ratio of binder to conductive powder and coating thickness controls the conductivity of the coating. A ratio 1:1 to 27.5:1 on a dry basis, with a preferred range of 8:1 to 15:1 provides effective conductivity, flexibility, and adherence of the first layer 114 to the electronic circuit. Once dry, the first layer has a thickness of about 0.5 mils to about 8 mils, with a preferred thickness of about 4 mils to about 5 mils.

In a second embodiment, the composition that results in the first layer 114 is comprised of nickel powder, toluene, tackifying resin, and styrene-isoprene-butadiene-styrene block copolymer. The ratios of nickel powder to block copolymer are the same as those for nickel powder to ethyl cellulose for the first embodiment. Tackifying resin improves adhesion of the block copolymer to the RFID tag, and may be included in any and all of the embodiments disclosed herein. Once dry, this version of the first layer has a thickness of about 0.5 mils to about 8 mils with a preferred range of about 2 mils to about 4 mils.

Four different types of conductive nickel powders, such as those available from Novamet Specialty Products of Lebanon, Tenn., are effective conductors for the first layer 114. The first type is conductive nickel spheres (CNS) having particle sizes ranging from 1-30 μm. CNS also possesses magnetic properties, allowing the particles to be aligned magnetically to form circuit paths. CNS contains no agglomerates, which means that a greater packing density can be achieved. A second type is silver coated nickel spheres having a particle size of 35-45 μm. These possess magnetic properties, allowing the particles to be aligned magnetically. The third and fourth types are conductive nickel powders of either 525-A or 525-B, available from Novamet. 525-A is a low density form of 525-B, and both are high purity filamentary powders made from thermal decomposition of nickel carbonyl that has been screened to remove large or agglomerated particles, further ensuring that the particle size is uniform and consistent throughout. Both forms have branch-like particle structures, increasing the electrical conductivity.

Various other example conductive powders available from various suppliers are listed in Table 1 below. Table 1 is understood to be a non-exhaustive, merely representative list of examples.

| Compound | Supplier | Particle Size |
| --- | --- | --- |
| Copper | Sigma Aldrich | <425 μm |
| Tin | Sigma Aldrich | <150 μm |
| Zinc | Sigma Aldrich | <10 μm |
| Aluminum | Sigma Aldrich | <5 μm |
| Silver | Sigma Aldrich | <100 nm |
| Carbon | Sigma Aldrich | 96.3 μm |
| Graphene | XG Sciences | 2-15 μm |

Regardless of the conductive powder used, the coating must target a selected resistance range for readability versus non-readability of the microchip or for toggling between different codes, one readable at a first temperature and the second readable at a temperature above a threshold temperature. When the first layer 114 is applied across the contacts, which are about 3 mm apart, to form the bypass circuit 110, a resistance of greater than 10 kΩ is an open system. There may be some readability at 1000Ω, and the system is considered closed at 100Ω or less (i.e., conductive), more preferredly, 20Ω or less. An RFID tag that is toggelable between different codes may have resistance requirements that vary for different configurations. In one example, an RFID tag reads one code when the layer(s) forming the bridge have a resistance that is greater than 20 MΩ and reads another code when the first layer(s) forming the bridge have a resistance that is less than 20 MΩ.

Figure 5:
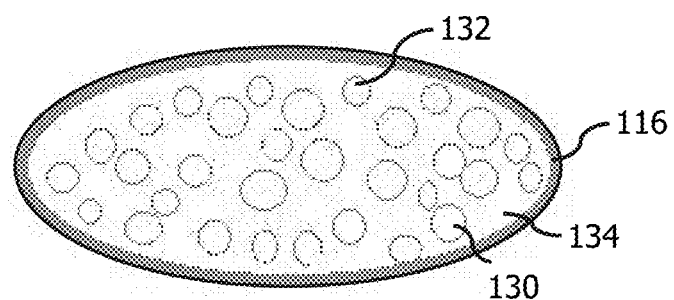
FIG. 5 is an enlarged, top plan view of the top layer of phase change material and colorant.

Referring now to FIGS. 3 and 5, the second layer 116 comprises a temperature sensitive composition (TSC) applied to the first layer 114. The application of the second layer 116 may be any known method, such as, printing, daubing, coating, or any other method of applying a wet composition that subsequently dries. Printing may be any of the methods disclosed above. The composition of the second layer 116, with reference to FIG. 5, is comprised of a binder 134, a solvent (evaporated), a phase change material 130, and a colorant 132. When the second layer 116 is exposed to a temperature over its selected temperature, the phase change material 130 melts and is soluble with the first layer 114. The phase change material is a nonconductor and physically separates and wraps the conductive material present in the first layer, thereby significantly reducing its conductivity and opening the bypass circuit, so that the microchip 104 is readable. The composition of the second layer 116 for application to the electronic circuit 102 comprises about 0.5% to about 5% by weight of binder, about 10% to about 40% by weight of a phase change material, about 0.1% to about 2% by weight of a colorant, and about 55% to about 90% by weight of a solvent.

The binder 134 selected is to assist with emulsification of the PCM in solution, to hold the PCM particles in suspension in solution, to produce a flexible layer once applied to the electronic circuit, and to bind the PCM particles when the solvent evaporates. The binder also is considered for its effectiveness in low concentration. If the concentration of the binder is too high, it will encapsulate the PCM, which is undesirable because the PCM will not flow into the conductive coating, thereby diluting it and rendering it nonconductive. Examples of suitable binders include, but are not limited to, cellulose deriviatives such as hydroxy ethylcellulose, polyvinyl alcohol, alkyl acrylate crosspolymer, acrylics, and combinations thereof.

Suitable solvents include, but are not limited to, ethyl alcohol, isopropyl alcohol, mineral spirits, water, and combinations thereof. Other solvents that evaporate or dry comparably to these example solvents are also suitable.

The PCM 130 controls the temperature response of the hybrid indicator, and is selected to penetrate or dissolve the binder in the first layer 114. Examples of PCMs are alkanes, alcohols, esters, and combinations (i.e., mixtures) thereof. The PCMs are not encapsulated or microencapsulated. Alcohols work well because they can partially dissolve ethylcellulose, if it is selected as the binder in the first layer 114, and the alcohols can be mixed together to get any number of melt points. Either esters or alkanes work well with block copolymer rubbers, if selected as the binder in first layer 114, because they swell the block polymer which will separate the conductive particles, reducing conductivity. Different molecular weight members within each family can be mixed to get any number of melt points. If the PCM is emulsified in the solvent, the PCM's mean particle size is about 5 μm to 50 μm, with a preferred particle size of about 15 μm to about 25 μm.

The alkanes include one or more straight-chain alkanes or paraffinic hydrocarbons having 12 to 44 carbons, represented by the formula $C_nH_{n+2}$. It can be appreciated from this range of carbons that it is understood that each alkane increasing in length by 1 carbon is described individually by this range. Some example paraffin hydrocarbons within this range are listed in the table below, along with their respective melting point:

| Compound Name | # Carbon Atoms | Melting Point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Suitable alcohol phase change materials include one or more alcohols where the major component is, for example, n-decanol, n-dodecanol, n-tetradecanol, n-hexadecanol, and n-octadecanol. Other suitable alcohols include fatty acid alcohols such as capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, geddyl alcohol, and mixtures thereof.

Suitable ester phase change materials include one or more $C_1$-$C_{10}$ alkyl esters of $C_{10}$-$C_{24}$ fatty acids, particularly methyl esters where the major component is methyl behenate, methyl arachidate, methyl stearate, methyl palmitate, methyl myristate, methyl laurate, methyl formate, methyl caprylate, methyl caprate, and methyl lignocerate.

The colorant 132 is added to the PCM to allow for visual indication of a temperature excursion. Suitable colorants are soluble in the PCM. The most suitable colorants are solvent soluble dyes, for example, Red 24, Red 164, Red 27, Red 430, Green 3, Blue 35, Black 5, and Yellow 124. The colorant 132 may also be a special effect pigment. Special effect pigments are high aspect ratio pigments that, depending upon the viewing angle relative thereto, appear transparent or appear as a specific color or a range of colors. Typically, a large viewing angle makes the SEPs appear transparent. Special effect pigments are available commercially, for example, from BASF under the brand names LUMINA® and MEARLIN® and Kobo Products, Inc. under the brand name KTZ®. SEPs are available in a variety of color effects.

As applied, the thickness of the second layer is about 1 mil to about 15 mils, with a preferred thickness of about 2 mils to about 3 mils.

Figure 7A:
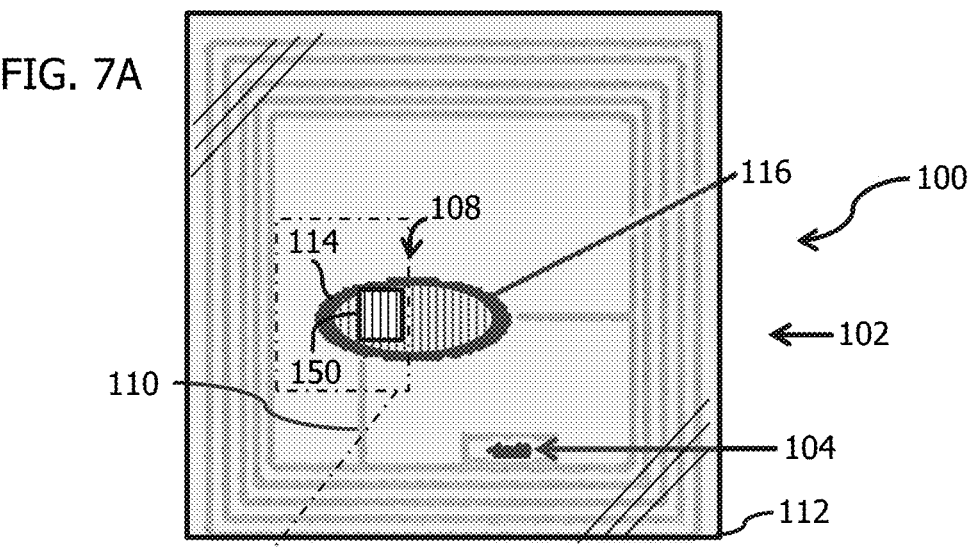
FIG. 7A is a top plan view of an embodiment of an RFID tag with a top layer of a phase change material and a colorant that is soluble in the phase change material, thereby coloring the top layer red, which is visible through a transparent window in a facing material.

Now referring to FIG. 7A, in an alternate embodiment, the hybrid indicator 100 includes a transparent window 150 in the facing material 112 positioned over the second layer 116, so that all or a portion of the second layer is visible therethrough. As illustrated, the bridge 108 has a first layer 116 having a conductive material therein and a second layer 116 having a PCM therein and a colorant, specifically a red colorant, that is soluble in the PCM, such that the colorant has colored the second layer 116. With the transparent window 150 present, the color of second layer 116 is visible to a viewer through the transparent window 150, but the black color of the conductive layer is not visible therethrough. For purely illustrative purposes, the red colorant has been mixed with the PCM under conditions that mix the red colorant throughout the composition. The composition is applied as a second layer 116, for example, by screen printing, over the first layer 114, and after drying, the second layer 116 is a red layer.

Figure 7B:
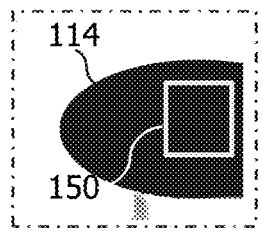
FIG. 7B is an enlarged view of the portion of the RFID tag in the dashed box in FIG. 7A after exposure to a temperature excursion.

Referring now to FIG. 7B, after the hybrid indicator 100 is exposed to a temperature at or above a threshold temperature of the PCM, the PCM melts and the PCM and PCM-soluble dye are both absorbed into the first layer 114 to change the conductive property thereof, and as a result the black color of the first layer 114 is now the color visible through the transparent window 150. Accordingly, the hybrid indicator 100 has both a visual color change and an electronic indication of a temperature excursion.

Figure 6:
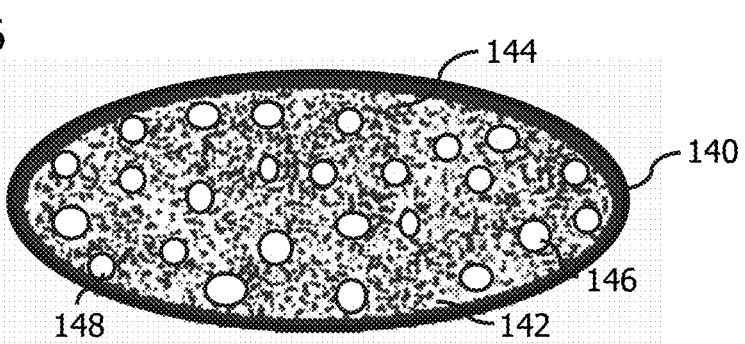
FIG. 6 is an enlarged, top plan view of a single layer of a conductive material, a phase change material, and a colorant.

Referring again to FIGS. 2 and 6, the bridge 108 as a single layer composition is described. The single layer composition is applied to the antenna 106 and/or an electrical lead to render the bypass 110 electrically conductive. The application of the single layer composition may be any known method, such as, printing, daubing, coating, or any other method of applying a wet composition that subsequently dries to form the single layer 140. Printing may be any of the methods disclosed above. The single layer composition is comprised of a binder, conductive material, phase change material, colorant, and a solvent. With reference to FIG. 6, the solvent evaporates, leaving the single layer 140 comprised of the binder 142, conductive material 144, phase change material 146, and colorant 148. The binder, conductive material, phase change material, colorant, and solvent may be any of the materials or combination of materials described above for each of the respective components for the bridge 108. This single layer composition comprises about 3% to about 15% by weight of binder, about 0.5% to about 12% by weight of a phase change material, about 40% to about 75% by weight of a solvent, and about 10% to about 40% by weight of a conductive material. As applied (dried), the thickness of the single layer is about 1 mil to about 15 mils, with a preferred range of about 4 mils to about 6 mils.

Figure 8:
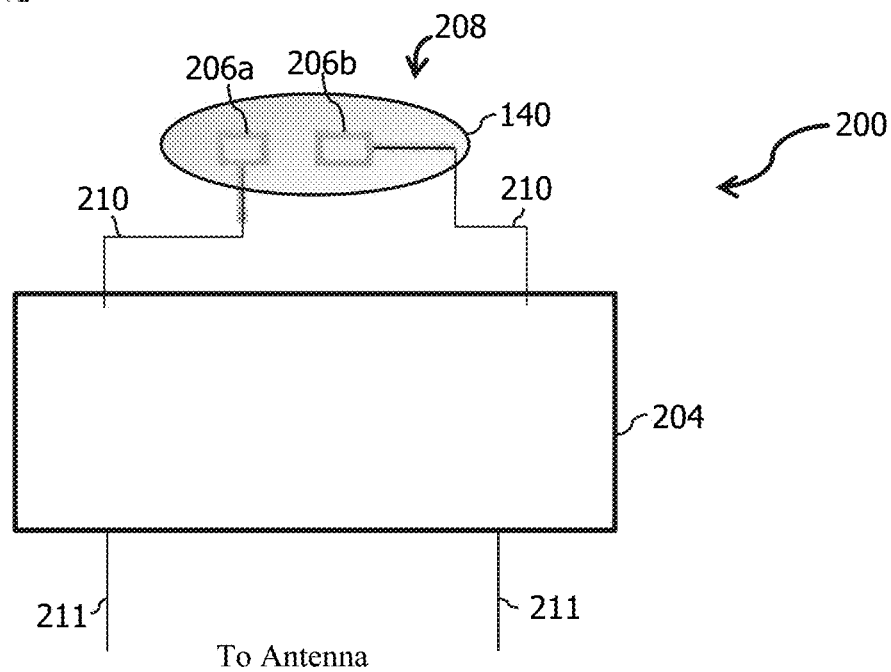
FIG. 8 is a schematic view of an embodiment of an electronic circuit having a bridge of conductive material, a phase change material, and a colorant over code circuit contacts.

Referring now to FIG. 8, another embodiment of a hybrid indictor 200 is illustrated. Here, rather than having a bridge across the antenna, the bridge 208 is across a different part of the circuit, in particular across code control contacts 206a, 206b. The microchip 204 is always "on," and reads a first code when the bridge 208 is conductive and reads a second code when the bridge is nonconductive, which is correlated to the presence of a PCM and exposure to or above a threshold temperature thereof. Here, the bridge 208 may be a single layer 140 as illustrated in FIG. 6 or have multiple layers as shown in FIGS. 3 and 7. Electrical leads 210 electrically connect the microchip 204 to the code control contacts 206a, 206b and electrical leads 211 electrically connect the microchip 204 to the antenna.

The hybrid indicators 100, 200, preferably embodiments with multiple layers, one of which is a top PCM-containing layer, may include a special effects pigment (SEP) as the colorant. The SEP is incorporated in such layer as about 2% to about 8% wt/wt of the composition thereof. The SEP is incorporated into the layer in a first orientation that renders the SEP generally transparent, such that the color of the layer is that of the PCM layer (second layer 116) without a second colorant, or the color of the colorant if the PCM layer includes a PCM soluble colorant. Accordingly, the SEP does not contribute to the color of the layer in its first (as-applied) orientation. Then, after the PCM melts, at a condition at or above the threshold temperature, the PCM dilutes into the base layer; thus, making the top layer transparent (i.e., the PCM changes from a white color to clear) and changing the special effect pigment to a second orientation that has a reflectance of color. This reveals the SEP and allows the SEP to settle to a more horizontal position resulting in high reflectance of color that is different than the color of the PCM or the conductive layer. The result is a change of color.

The hybrid indicators disclosed herein may be constructed in the form of a tag or label integral with packaging or applicable to packaging. Here, the electronic circuit has a back layer, such as a protective film or paper, that may or may not have an adhesive layer on the side opposite the electronic circuit to allow bonding of the hybrid indicator to a product or its packaging. The opposite face of the electronic circuit (opposite the back layer, i.e., the front face) may be covered with a facing material 112 that enables the colorant to be visible to the user after the selected temperature was reached. In one embodiment, the facing material 112 is a paper layer suitable for absorbing the colorant, i.e., the colorant migrates from a backside of the paper layer to the frontside thereof where the colorant is visible to the user. In another embodiment, the facing material 112 has a transparent window (as shown in FIG. 7) through which the colorant is visible once the preselected temperature is reached. If the facing material 112 is a paper layer, a protective laminate may be positioned over the paper layer to protect the paper layer and its appearance.

In all the compositions discussed above, whether a single layer or a multi-layer bridge, the coating compositions may include other common additives to give desired characteristics, such as, but not limited to, emulsifiers, thickeners, preservatives, plasticizers, and defoamers.

As used herein, "about" means plus or minus 10% of the expressed value, more preferably plus or minus 5% of the expressed value.

Preparation of a Hybrid Indicator using an RFID circuit.

EXAMPLE 1

Part A: Preparation of a Conductive Composition

A five percent solution of ethylcellulose in isopropyl alcohol was prepared. A NOVAMET® 525B conductive nickel powder was added in a 0.6:1 ratio by weight to the ethylcellulose solution and mixed thoroughly. Type 525 conductive nickel powder is a high purity filamentary powder made from thermal decomposition of nickel carbonyl that has been screened to remove large or agglomerated particles.

Part B: Preparation of a Phase Change Material Composition

Tetradecanol (a PCM with a 38° C. melt point) was emulsified in an aqueous polyvinyl alcohol and alkyl acrylate cross-polymer solution in a 1:2 ratio by weight.

The conductive composition made according to Part A was applied to the RFID tag across the contacts, as shown in FIG. 2, and was allowed to dry. A wet thickness of 3 mils or greater is preferred. After the conductive composition was dry, the phase change material composition was applied over the dry conductive composition as shown in FIG. 3 and was allowed to dry. A thickness of 1 mil or greater is preferred for the phase change material composition. The RFID tag can be sandwiched between a facing material 112, such as a layer of paper that may include printed artwork/instructions, if desired, and adhesive tape or the like.

To test the hybrid indictor, the RFID tag made according to the process of Example 1, without the facing material 112 or an adhesive backing, was first, before exposure to a heat source, placed within range of an RFID reader to ensure that the bypass circuit was indeed closed and that the microchip was not readable. Then, the RFID tag was sealed in a waterproof pouch and set in a controlled temperature water bath set at 35° C. and monitored with an electronic digital thermometer. The temperature was raised in 1.0° C. intervals and held 5 minutes at each interval. At each interval, the indicator was lifted to near the top of the water but not out of the water and brought into range of a reader. When the reader was able to read the microchip, the temperature was recorded to be 36° C. The colorant changed around the same temperature of 36° C. Over several trials of additional RFID tags, the temperatures varied slightly, but there was no more than a 1° C. difference.

EXAMPLE 2

In another aspect, the bridge of the bypass circuit can be a single layer composition that contains both the conductive powders and the phase change material. A single layer composition simplifies the production process by eliminating an application and drying step. Here, an aqueous solution of 1.6% SELVOL™ polyvinyl alcohol 540 was prepared, and kept warm in a 70° C. water bath. A phase change material blend having a melt point of 50° C. was melted and kept warm in a 70° C. water bath. The aqueous solution of PVA was poured into a blender cup, and while mixing, the melted PCM blend was added slowly to form an emulsion. When the mean particle size of the PCM was approximately 25 μm, the blender contents were poured into a beaker and cooled to room temperature. To 82.4 grams of the PCM emulsion, 17.65 grams of nickel 525B powder were added and mixed until smooth.

The composition was applied as a bridge on the RFID tag to form the bypass circuit at a 6 mil wet thickness or approximately a 2 mil thickness when dry. The bridge formed by the dry composition, before exposure to a heat source, was placed within range of an RFID reader to ensure that the bypass circuit was indeed closed and that the microchip was not readable. The RFID tag was flexed to stress the bridge formed by the dry composition, and the bridge maintained its conductivity. Additionally, when heated above 50° C., using the procedure set forth in Example 1, the tag was now readable.

EXAMPLE 3

Part A: Preparation of a Conductive Composition 7.2 grams of KRATON® 1650U styrene-isoprene-butadiene-styrene block copolymer and 7.2 grams of PENTA-LYN® H tackifier were dissolved in 78.5 grams of Toluene. Then, 71.6 grams of NOVAMET® 525B Nickel powder were fully dispersed into the solution.

Part B: Preparation of the Phase Change Composition 60 grams of a 1.5% SELVOL™ 540 Polyvinyl Alcohol and 0.1% alkyl acrylate cross-polymer solution in de-ionized water was prepared. The pH was adjusted to 6 with 5% sodium hydroxide. 30 grams of PURETEMP® 53x (53° C. melt point) PCM were heated to 70° C. and emulsified in the PVA solution. Thereafter, the emulsion was cooled to room temperature. Then, 2% wt/wt of LUMINA® special effect pigment based on total batch weight was added and mixed into the PCM emulsion.

Part A was screen coated onto Mylar with a 60 mesh screen to achieve approximately 3 mil dry thickness. Resistance was measured at 10 ohms to 100 ohms across a 3 mm wide, 1 cm long coating. Part B was screen printed over the layer of screen coated Part A using a 60 mesh screen to achieve an indicator having a dry thickness of approximately 3 mil. Here, Part A was black and Part B was white. Part B is applied at a thickness sufficient that the white color of the layer thereof obscures the black color of Part A, i.e., the black color is not visible through the white color of Part B.

After application, but before the indicator experiences a temperature at or above the threshold temperature of the PCM, the LUMINA® special effect pigment is transparent in the layer defined by Part B and the white color thereof is visible to a viewer. However, once the indicator is heated to or above the threshold temperature, the resistance of Part A changed to greater than 20 MΩ because the PCM from Part B was absorbed into Part A, but the LUMINA® special effect pigment remained on top of Part A. With the PCM removed from the LUMINA® special effect pigment, Part A becomes transparent and the special effect pigments change to an orientation that results in high reflectance of color, other than white, that is now visible to a user.

The hybrid indicators 100, 200 (FIGS. 3, 7 and 8) disclosed herein provide multiple advantages, including a visual indicator to tell the user to scan or read a particular hybrid indicator and as a self-verification of a temperature change. The hybrid indicators are flexible so that the bridge 108, 208 maintains its conductivity in the initial phase and the bridge can be engineered to activate at a selected temperature. Using differing phase change material and/or combinations of the phase change material, the selected temperature is a temperature within the range of 20° C. to 80° C., and possibly higher. Furthermore, the hybrid sensors are a lower cost alternative with no battery, which also makes them lightweight.

Although the invention is shown and described with respect to certain embodiments, it is obvious that modifications will occur to those skilled in the art upon reading and understanding the specification, and the present invention includes all such modifications.

What is claimed is:

1. A visually and electronically readable temperature indicator comprising:
   an electric circuit having a microchip and a bridge within the circuit; and
   a facing material over the electric circuit having a transparent window or an absorbent material over at least a portion of the bridge;
   wherein the bridge comprises:
      a base layer comprising a conductive material and a first binder; and
      a top layer applied over the base layer, the top layer comprising a phase change material having a pre-selected melt temperature, a colorant, and a second binder;
      wherein the colorant is soluble in the phase change material;
   wherein at temperatures below the pre-selected melt temperature, the bridge has an original electrically conductive state, and at a temperature at or above the pre-selected melt temperature, the phase change material melts and dilutes the conductive material, thereby rendering the bridge non-conductive or less conductive than the original electrically conductive state and a color change occurs that is visible to a user through the transparent window or in the absorbent material;
   wherein the colorant, as applied, imparts a color to the top layer, and, at a temperature at or above the pre-selected melt temperature, the colorant dilutes the conductive material collectively with the phase change material and the color of the base layer dominates the color of the colorant and the color of the base layer is visible to the user as a color change.

2. The temperature indicator of claim 1, wherein the first and second binders are different.

3. The temperature indicator of claim 1, wherein the electronic circuit is an RFID tag.

4. The temperature indicator of claim 1, wherein the microchip is non-readable when the bridge is electrically conductive, and is readable when the bridge is non-electrically conductive.

5. The temperature indicator of claim 1, wherein the microchip reads a first code when the bridge is electrically conductive, and a second code when the bridge is non-electrically conductive, the second code being different from the first code.

6. The temperature indicator of claim 1, wherein the phase change material has a pre-selected melt temperature within a range of 20 ° C. to 80 ° C.

7. The temperature indicator of claim 1, wherein the conductive material comprises metal in powder form.

8. The temperature indicator of claim 7, wherein the metal in powder form comprises nickel.

9. The temperature indicator of claim 1, wherein the transparent window is present in the facing material.

10. A visually and electronically readable temperature indicator comprising:

an electric circuit having a microchip and a bridge within the circuit; and a facing material over the electric circuit having a transparent window or an absorbent material over at least a portion of the bridge;

wherein the bridge comprises:
  a base layer comprising a conductive material and a first binder; and
  a top layer applied over the base layer, the top layer comprising a phase change material having a pre-selected melt temperature, a colorant, and a second binder;

wherein at temperatures below the pre-selected melt temperature, the bridge has an original electrically conductive state, and at a temperature at or above the pre-selected melt temperature, the phase change material melts and dilutes the conductive material, thereby rendering the bridge non-conductive or less conductive than the original electrically conductive state and a color change occurs that is visible to a user through the transparent window or in the absorbent material;

wherein the colorant comprises a special effect pigment that has a first orientation in the top layer that is transparent to the user and a dye that is soluble in the phase change material and imparts a color to the top layer; and wherein at a temperature at or above the pre-selected melt temperature, the special effect pigment remains as a top layer over the base layer and the dye and phase change material collectively dilute the base layer leaving the special effect pigment in a second orientation that has a reflectance of color.

11. The temperature indicator of claim 10, wherein the electronic circuit is an RFID tag.

12. The temperature indicator of claim 10, wherein the microchip is non-readable when the bridge is electrically conductive and is readable when the bridge is non-electrically conductive, or the microchip reads a first code when the bridge is electrically conductive and a second code when the bridge is non-electrically conductive, the second code being different from the first code.

13. The temperature indicator of claim 10, wherein the phase change material has a pre-selected melt temperature within a range of 20 ° C. to 80 ° C.

* * * * *